US012716434B2

(12) United States Patent
Clifton et al.

(10) Patent No.: US 12,716,434 B2
(45) Date of Patent: Aug. 25, 2026

(54) TEMPERATURE REGULATION SYSTEM FOR VEHICLE HYDRAULIC SYSTEM

(71) Applicant: Oshkosh Corporation, Oshkosh, WI (US)

(72) Inventors: Cody D. Clifton, Mapleton, MN (US); Derek Wente, Austin, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/967,988

(22) Filed: Dec. 4, 2024

(65) Prior Publication Data

US 2025/0092890 A1 Mar. 20, 2025

Related U.S. Application Data

(63) Continuation of application No. 18/131,733, filed on Apr. 6, 2023, now Pat. No. 12,188,496, which is a continuation of application No. 17/466,118, filed on Sep. 3, 2021, now Pat. No. 11,649,838, which is a continuation of application No. 16/810,989, filed on Mar. 6, 2020, now Pat. No. 11,137,002.

(60) Provisional application No. 62/841,657, filed on May 1, 2019.

(51) Int. Cl.
*F15B 21/0427* (2019.01)
*B62D 63/04* (2006.01)
*F15B 21/045* (2019.01)

(52) U.S. Cl.
CPC .......... *F15B 21/0427* (2019.01); *B62D 63/04* (2013.01); *F15B 21/045* (2013.01)

(58) Field of Classification Search
CPC ........................... F15B 21/045; F15B 21/0427
See application file for complete search history.

(56) References Cited

U.S. PATENT DOCUMENTS

| | | | | |
|---|---|---|---|---|
| 5,768,972 | A | 6/1998 | Christenson et al. | |
| 9,145,905 | B2 | 9/2015 | Hou | |
| 9,494,170 | B2 | 11/2016 | Hou | |
| 10,414,067 | B2 | 9/2019 | Datema et al. | |
| 10,697,481 | B2 | 6/2020 | Baba | |
| 2005/0004733 | A1 | 1/2005 | Pillar et al. | |
| 2010/0170238 | A1* | 7/2010 | Behr | B64C 13/40 60/459 |

(Continued)

FOREIGN PATENT DOCUMENTS

| | | | |
|---|---|---|---|
| JP | 58-137106 | S | 8/1983 |
| JP | 2002-227241 | A | 8/2002 |

*Primary Examiner* — Nathaniel E Wiehe
*Assistant Examiner* — Daniel S Collins
(74) *Attorney, Agent, or Firm* — Foley & Lardner LLP

(57) ABSTRACT

The hydraulic system includes a reservoir configured to store hydraulic fluid, an actuator, a first conduit coupling the reservoir to the actuator, a second conduit having a first end and a second end, a first valve positioned between the first end of the second conduit and the first conduit, a second valve positioned between the second end of the second conduit and the first conduit, and a pump configured to drive the hydraulic fluid from the reservoir to the actuator. The hydraulic fluid flows through the first conduit to the actuator when the first valve is in a first position. The hydraulic fluid flows partially through the first conduit, through the second conduit, back to the first conduit, and to the actuator when the first valve is in a second position.

10 Claims, 11 Drawing Sheets

(56) References Cited

U.S. PATENT DOCUMENTS

| | | | |
|---|---|---|---|
| 2014/0271066 | A1 | 9/2014 | Hou |
| 2015/0033720 | A1 | 2/2015 | Mate et al. |
| 2015/0232269 | A1 | 8/2015 | Hou |
| 2017/0361491 | A1 | 12/2017 | Datema et al. |
| 2017/0361492 | A1 | 12/2017 | Datema et al. |
| 2018/0038074 | A1 | 2/2018 | Nishihata |
| 2018/0250847 | A1 | 9/2018 | Wurtz et al. |
| 2019/0121353 | A1 | 4/2019 | Datema et al. |
| 2019/0325220 | A1 | 10/2019 | Wildgrube et al. |
| 2019/0338793 | A1 | 11/2019 | Uhlman et al. |
| 2019/0344475 | A1 | 11/2019 | Datema et al. |
| 2020/0078986 | A1 | 3/2020 | Clifton et al. |
| 2020/0230841 | A1 | 7/2020 | Datema et al. |
| 2020/0230842 | A1 | 7/2020 | Datema et al. |

* cited by examiner

TEMPERATURE REGULATION SYSTEM FOR VEHICLE HYDRAULIC SYSTEM

CROSS-REFERENCE TO RELATED PATENT APPLICATIONS

This application is a continuation of U.S. patent application Ser. No. 18/131,733, filed Apr. 6, 2023, which is a continuation of U.S. patent application Ser. No. 17/466,118, filed Sep. 3, 2021, which is a continuation of U.S. patent application Ser. No. 16/810,989, filed Mar. 6, 2020, which claims the benefit of and priority to U.S. Provisional Patent Application No. 62/841,657, filed May 1, 2019, all of which are incorporated herein by reference in their entireties.

BACKGROUND

Vehicles and machinery often include hydraulically driven components. During cold weather operating conditions, operation of the hydraulically driven components may be negatively impacted.

SUMMARY

One embodiment relates to a hydraulic system for a machine. The hydraulic system includes a hydraulic circuit, an auxiliary flow circuit, a temperature sensor, and a controller. The hydraulic circuit includes a first conduit, a reservoir configured to store hydraulic fluid and coupled to the first conduit, and a pump configured to drive the hydraulic fluid from the reservoir through the first conduit to an actuator. The auxiliary flow circuit includes a second conduit, a first valve coupling the first conduit to a first end of the second conduit where the first valve positioned to selectively permit the hydraulic fluid to flow through the second conduit, and a second valve coupling the first conduit to a second end of the second conduit. The temperature sensor is configured to acquire temperature data indicative of a temperature of the hydraulic fluid. The controller is configured to operate the pump to drive the hydraulic fluid from the reservoir through the first conduit to the actuator, monitor the temperature of the hydraulic fluid, and engage the first valve to divert the hydraulic fluid from the first conduit into the second conduit and back to the first conduit based on the temperature of the hydraulic fluid.

Another embodiment relates to a hydraulic system for a machine. The hydraulic system includes a reservoir configured to store hydraulic fluid, an actuator, a first conduit coupling the reservoir to the actuator, a second conduit having a first end and a second end, a first valve positioned between the first end of the second conduit and the first conduit, a second valve positioned between the second end of the second conduit and the first conduit, and a pump configured to drive the hydraulic fluid from the reservoir to the actuator. The hydraulic fluid flows through the first conduit to the actuator when the first valve is in a first position. The hydraulic fluid flows partially through the first conduit, through the second conduit, back to the first conduit, and to the actuator when the first valve is in a second position.

Still another embodiment relates to a hydraulic system. The hydraulic system includes a reservoir configured to store hydraulic fluid, an actuator, a first conduit coupling the reservoir to the actuator, a second conduit having a first end and a second end where the first end and the second end are coupled to the first conduit, a valve positioned between the first end of the second conduit and the first conduit, a heater positioned within the reservoir or along the first conduit, and a pump configured to drive the hydraulic fluid from the reservoir to the actuator. The hydraulic fluid flows through the first conduit to the actuator when the valve is in a first position. The hydraulic fluid flows partially through the first conduit, through the second conduit, back to the first conduit, and to the actuator when the valve is in a second position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle or machine includes a hydraulic circuit having a heater and one or more hydraulic actuators configured to facilitate manipulating controllable vehicle/machine components (e.g., a boom, lift arms, a mixer drum, a pumping system, outriggers, etc.). In cold weather conditions, hydraulic fluid can become overly viscous and negatively impact performance of the controllable vehicle/machine components. By way of example, the engine of the vehicle or machine may stall (e.g., from increased load to drive a pump that pumps the hydraulic fluid, etc.) and/or lead to slow cycle times when the temperature of hydraulic fluid drops below of a target operating range. Further, traditional systems may include manually activated heater circuits that are often forgotten to be activated by operators and require constant operator monitoring. According to an exemplary embodiment, the heater of the present disclosure is configured to facilitate automatically heating and maintaining the temperature of hydraulic fluid within the hydraulic circuit at or above a target temperature, absent any operator input. The heater of the present disclosure therefore enables improved performance by providing consistent performance throughout an operating day and eliminating any need for operator input.

According to the exemplary embodiment shown in FIGS. 1-8, a vehicle or machine, shown as vehicle 10, includes (i) a control system, shown as control system 150, and (ii) a hydraulic circuit, shown hydraulic circuit 200. According to an exemplary embodiment, the control system 150 is configured to control operation of components of the hydraulic circuit 200 to maintain a temperature of hydraulic fluid therein within a target operating range absent any user interaction.

Figure 1:
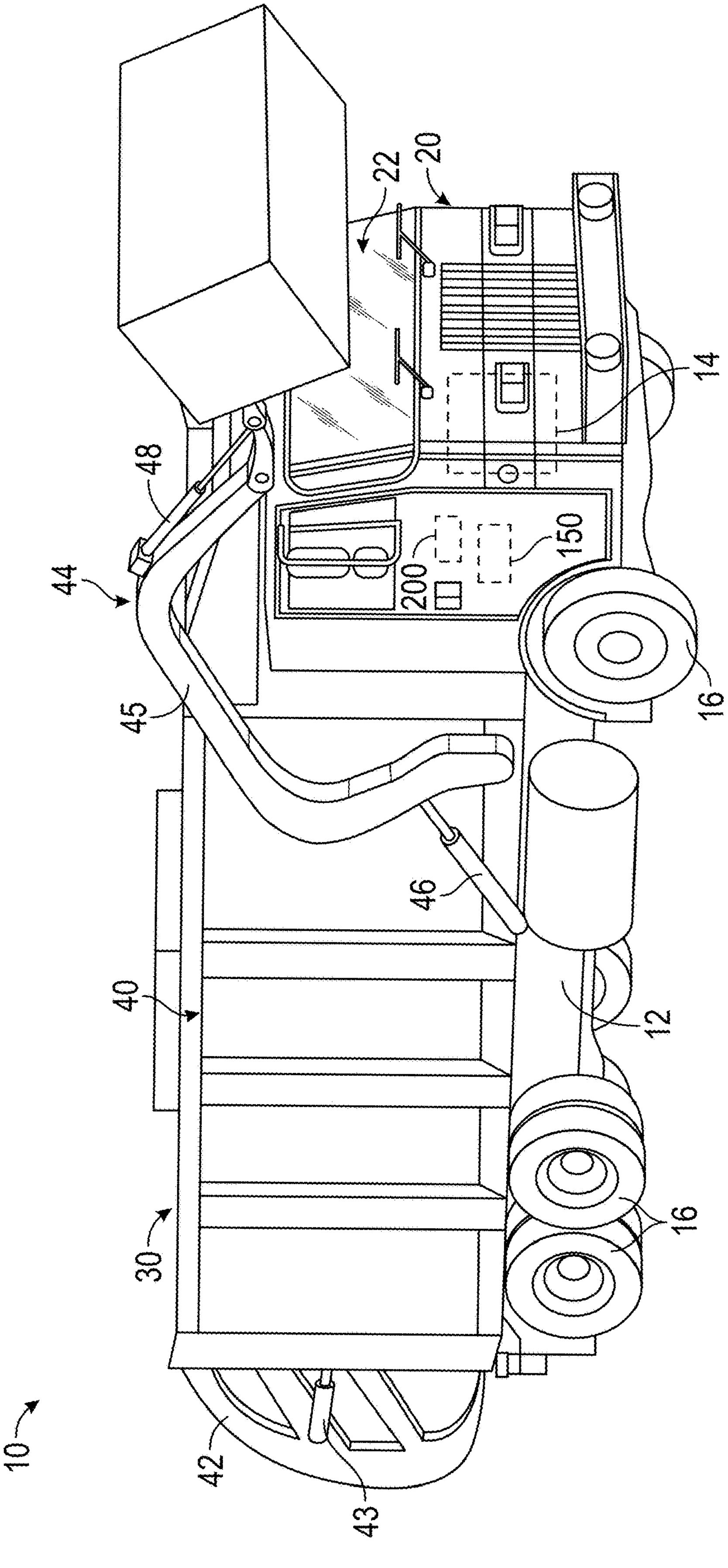
FIG. 1 is a perspective view of a refuse vehicle, according to an exemplary embodiment.
Figure 2:
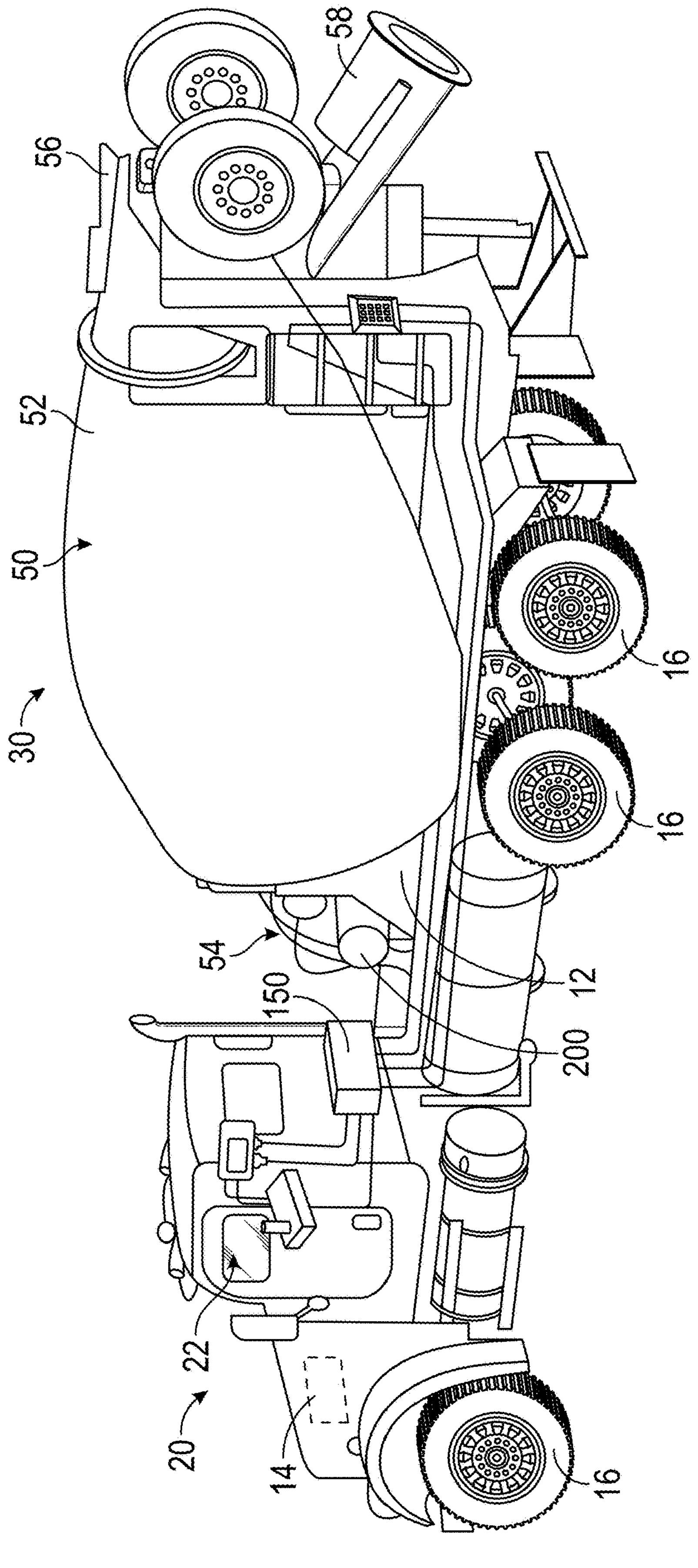
FIG. 2 is a perspective view of a mixer vehicle, according to an exemplary embodiment.
Figure 3:
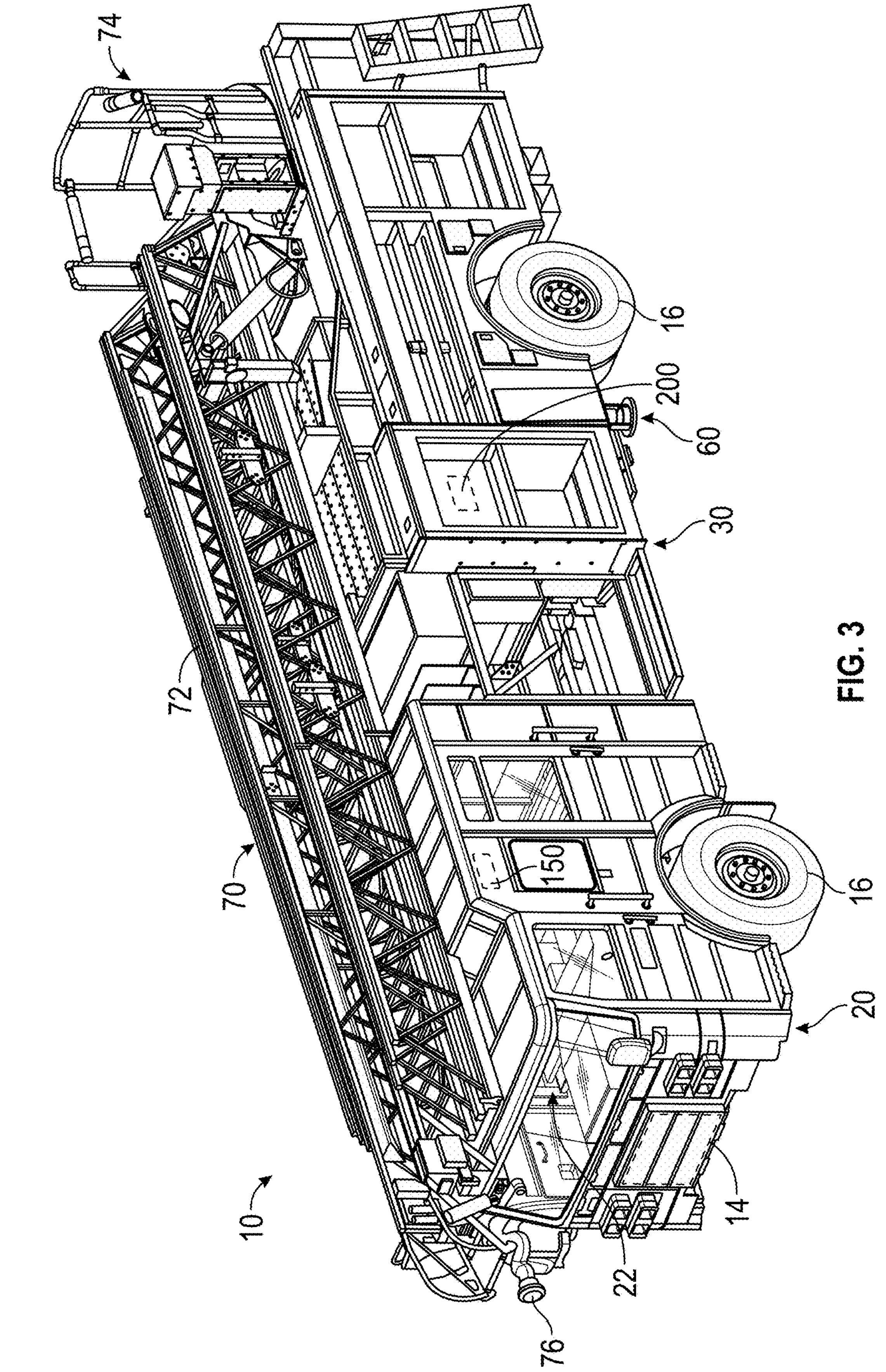
FIG. 3 is a perspective view of a firefighting vehicle, according to an exemplary embodiment.
Figure 4:
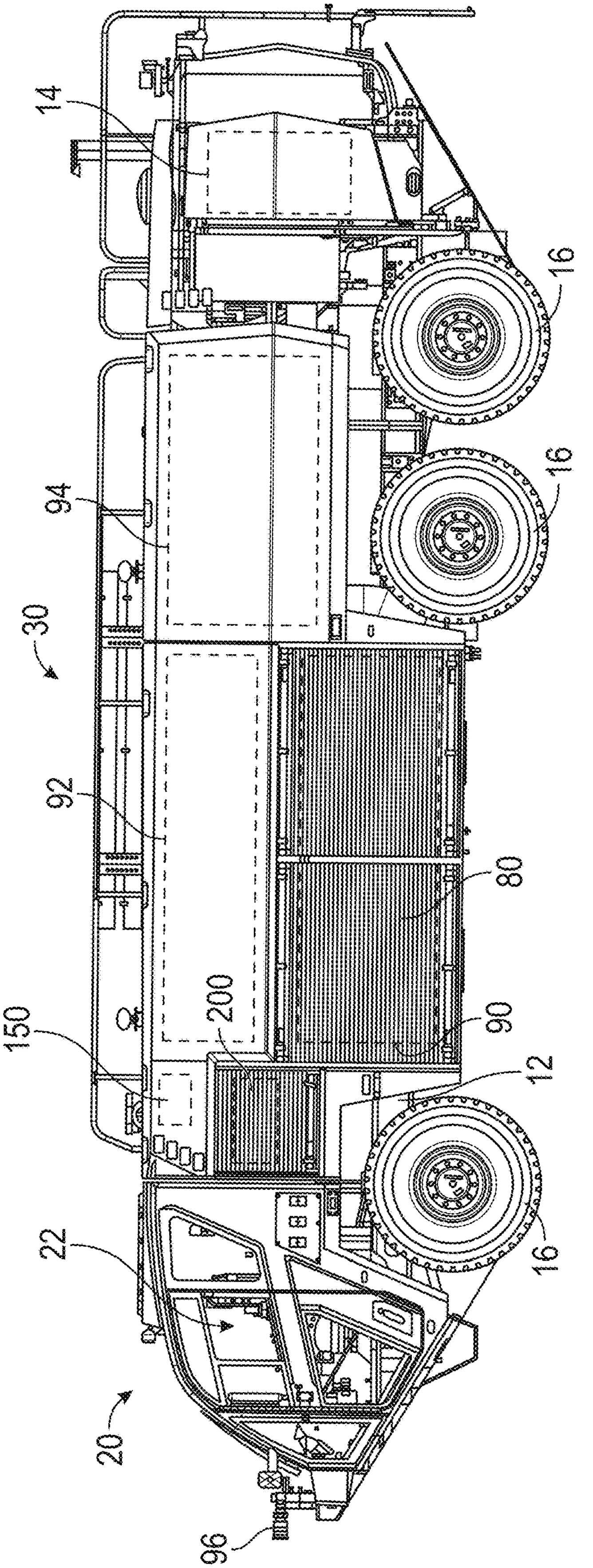
FIG. 4 is a perspective view of an airport firefighting vehicle, according to an exemplary embodiment.

As shown in FIGS. 1-4, the vehicle 10 includes a chassis, shown as frame 12; a front cabin, shown as cab 20, coupled to the frame 12 (e.g., at a front end thereof, etc.) and defining an interior, shown as interior 22; and a rear assembly, shown as rear assembly 30, coupled to the frame 12 (e.g., at a rear end thereof, etc.). The cab 20 may include various components to facilitate operation of the vehicle 10 by an operator (e.g., a seat, a steering wheel, hydraulic controls, a user interface, switches, buttons, dials, etc.). As shown in FIGS. 1-6, the vehicle 10 includes a prime mover, shown as engine 14, coupled to the frame 12. As shown in FIGS. 1-3, the engine 14 is positioned beneath the cab 20. As shown in FIG. 4, the engine 14 is positioned within the rear assembly 30 at the rear of the vehicle 10. As shown in FIGS. 1-6, the vehicle 10 includes a plurality of tractive elements, shown as wheel and tire assemblies 16. In other embodiments, the tractive elements include track elements. According to an exemplary embodiment, the engine 14 is configured to provide power to the wheel and tire assemblies 16 and/or to other systems of the vehicle 10 (e.g., a pneumatic system, a hydraulic system, etc.). The engine 14 may be configured to utilize one or more of a variety of fuels (e.g., gasoline, diesel, biodiesel, ethanol, natural gas, etc.), according to various exemplary embodiments. According to an alternative embodiment, the engine 14 additionally or alternatively includes one or more electric motors coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine genset, etc.), and/or from an external power source (e.g., overhead power lines, etc.) and provide power to the systems of the vehicle 10.

According to the exemplary embodiments shown in FIG. 1, the vehicle 10 is configured as a front loading refuse vehicle (e.g., a garbage truck, a waste collection truck, a sanitation truck, a recycling truck, etc.). In other embodiments, the vehicle 10 is configured as a side-loading refuse truck or a rear-loading refuse truck. As shown in FIG. 1, the rear assembly 30 is configured as a rear body, shown as refuse compartment 40. According to an exemplary embodiment, the refuse compartment 40 facilitates transporting refuse from various waste receptacles within a municipality to a storage and/or processing facility (e.g., a landfill, an incineration facility, a recycling facility, etc.). By way of example, loose refuse may be placed into the refuse compartment 40 where it may thereafter be compacted. The refuse compartment 40 may provide temporary storage for refuse during transport to a waste disposal site and/or a recycling facility. In some embodiments, the refuse compartment 40 includes a hopper volume and a storage volume. Refuse may be initially loaded into the hopper volume and thereafter compacted into the storage volume. According to an exemplary embodiment, the hopper volume is positioned between the storage volume and the cab 20 (i.e., refuse is loaded into a position of the refuse compartment 40 behind the cab 20 and stored in a position further toward the rear of the refuse compartment 40). In other embodiments, the storage volume is positioned between the hopper volume and the cab 20 (e.g., in a rear-loading refuse vehicle, etc.). As shown in FIG. 1, the refuse compartment 40 includes a pivotable rear portion, shown as tailgate 42. The tailgate 42 is pivotally coupled to the refuse compartment 40 and movable between a closed orientation and an open orientation by actuators, shown as tailgate actuators 43 (e.g., to facilitate emptying the storage volume, etc.).

As shown in FIG. 1, the vehicle 10 includes a lift mechanism/system (e.g., a front-loading lift assembly, etc.), shown as lift assembly 44, having a pair of lift arms, shown as lift arms 45, coupled to the frame 12 and/or the rear assembly 30 on each side of the vehicle 10 such that the lift arms 45 extend forward of the cab 20 (e.g., a front-loading refuse vehicle, etc.). In other embodiments, the lift assembly 44 extends rearward of the rear assembly 30 (e.g., a rear-loading refuse vehicle, etc.). In still other embodiments, the lift assembly 44 extends from a side of the rear assembly 30 and/or the cab 20 (e.g., a side-loading refuse vehicle, etc.). The lift arms 45 may be rotatably coupled to frame 12 with a pivot (e.g., a lug, a shaft, etc.). As shown in FIG. 1, the lift assembly 44 includes actuators, shown as lift arm actuators 46 and articulation actuators 48 (e.g., hydraulic cylinders, etc.), coupled to the frame 12 and/or the lift arms 45. The lift arm actuators 46 are positioned such that extension and retraction thereof rotates the lift arms 45 about an axis extending through the pivot, according to an exemplary embodiment. The lift arms 45 may be rotated by the lift arm actuators 46 to lift a refuse container over the cab 20. The articulation actuators 48 are positioned to articulate the distal ends of the lift arms 45 coupled to the refuse container to assist in tipping refuse out of the refuse container into the hopper volume of the refuse compartment 40 (e.g., through an opening in the refuse compartment 40, etc.). The lift arm actuators 46 may thereafter rotate the lift arms 45 to return the empty refuse container to the ground.

According to the exemplary embodiment shown in FIG. 2, the vehicle 10 is configured as a concrete mixer truck. As shown in FIG. 2, the rear assembly 30 of the vehicle 10 includes a concrete drum assembly, shown as drum assembly 50. According to an exemplary embodiment, the vehicle 10 is configured as a rear-discharge concrete mixing truck. In other embodiments, the vehicle 10 is configured as a front-discharge concrete mixing truck.

As shown in FIG. 2, the drum assembly 50 of the vehicle 10 includes a drum, shown as mixing drum 52. The mixing drum 52 is coupled to the frame 12 and disposed behind the cab 20 (e.g., at a rear and/or middle of the frame 12, etc.). As shown in FIG. 2, the drum assembly 50 includes a drive system, shown as drum drive system 54, that is coupled to the frame 12. According to an exemplary embodiment, the drum drive system 54 is configured to selectively rotate the mixing drum 52 about a central, longitudinal axis thereof. In one embodiment, the drum drive system 54 is driven by the engine 14. In other embodiments, the drum drive system 54 is individually powered, separate from the engine 14 (e.g., with a motor, an independently driven actuator, etc.). According to an exemplary embodiment, the axis is elevated from the frame 12 at an angle in the range of five degrees to twenty degrees. In other embodiments, the axis is elevated by less than five degrees (e.g., four degrees, three degrees, etc.) or greater than twenty degrees (e.g., twenty-five degrees, thirty degrees, etc.). In an alternative embodiment, the vehicle 10 includes an actuator positioned to facilitate selectively adjusting the axis to a desired or target angle (e.g., manually in response to an operator input/command, automatically according to a control scheme, etc.).

As shown in FIG. 2, the mixing drum 52 of the drum assembly 50 includes an inlet, shown as hopper 56, and an outlet, shown as chute 58. According to an exemplary embodiment, the mixing drum 52 is configured to receive a mixture, such as a concrete mixture (e.g., cementitious material, aggregate, sand, etc.), with the hopper 56. The mixing drum 52 may additionally include an injection port. The injection port may provide access into the interior of the mixing drum 52 to inject water and/or chemicals (e.g., air entrainers, water reducers, set retarders, set accelerators, superplasticizers, corrosion inhibitors, coloring, calcium chloride, minerals, and/or other concrete additives, etc.). According to an exemplary embodiment, the injection port includes an injection valve that facilitates injecting the water and/or the chemicals from a fluid reservoir (e.g., a water tank, etc.) into the mixing drum 52 to interact with the mixture, while preventing the mixture within the mixing drum 52 from exiting the mixing drum 52 through the injection port. The mixing drum 52 may include a mixing element (e.g., fins, etc.) positioned within the interior thereof. The mixing element may be configured to (i) agitate the contents of mixture within the mixing drum 52 when the mixing drum 52 is rotated by the drum drive system 54 in a first direction (e.g., counterclockwise, clockwise, etc.) and (ii) drive the mixture within the mixing drum 52 out through the chute 58 when the mixing drum 52 is rotated by the drum drive system 54 in an opposing second direction (e.g., clockwise, counterclockwise, etc.). The chute 58 may include an actuator positioned such that the chute 58 is selectively pivotable to reposition the chute 58 (e.g., vertically, laterally, etc.) and therefore an angle at which the mixture is expelled from the mixing drum 52.

According to the exemplary embodiment shown in FIG. 3, the vehicle 10 is configured as a single rear axle quint fire truck. In other embodiments, the vehicle 10 is configured as a tandem rear axle quint fire truck. In still other embodiments, the vehicle 10 is configured as another type of fire apparatus such as a tiller fire truck, an aerial platform fire truck, a mid-mount fire truck, etc. As shown in FIG. 3, the rear assembly 30 includes stabilizers, shown as outriggers 60, coupled to the frame 12 and an aerial assembly, shown as ladder assembly 70, disposed on top of the rear assembly 30. The outriggers 60 may be selectively extended from each lateral side and/or rear of the rear assembly 30 to provide increased stability while the vehicle 10 is stationary and the ladder assembly 70 is in use (e.g., extended from the vehicle 10, etc.). The outriggers 60 may be supplemented by or replaced by one or more downriggers coupled to the front and/or the rear of the frame 12. The rear assembly 30 further includes various compartments, cabinets, etc. that may be selectively opened and/or accessed for storage and/or component inspection, maintenance, and/or replacement.

As shown in FIG. 3, the ladder assembly 70 includes a plurality of ladder sections, shown as ladder sections 72, that are slidably coupled together such that the ladder sections 72 are extendable and retractable. The ladder assembly 70 further includes a base platform, shown as turntable 74, positioned at the base or proximal end of the ladder sections 72. The turntable 74 is configured to rotate about a vertical axis such that the ladder sections 72 may be selectively pivoted about the vertical axis (e.g., up to 360 degrees, etc.). As shown in FIG. 3, the ladder assembly 70 includes an implement, shown as water turret 76, coupled to the distal end of the ladder sections 72. The water turret 76 is configured to facilitate expelling water and/or a fire suppressing agent (e.g., foam, etc.) from a water storage tank and/or agent tank onboard the vehicle 10 and/or from an external water source (e.g., a fire hydrant, a separate water truck, etc.). In other embodiments, the ladder assembly 70 does not include the water turret 76. In such embodiments, the ladder assembly 70 may include an aerial platform coupled to the distal end of the ladder sections 72.

According to the exemplary embodiment shown in FIG. 4, the vehicle 10 is configured as an airport rescue firefighting ("ARFF") truck. In other embodiments, the vehicle 10 is still another type of fire apparatus. As shown in FIG. 4, the rear assembly 30 include compartments, shows as compartments 80. The compartments 80 may be selectively opened to access components of the vehicle 10. As shown in FIG. 4, the rear assembly 30 includes a pump system (e.g., an ultra-high-pressure pump system, etc.), shown as pump system 90, disposed within the compartments 80 of the rear assembly 30. The pump system 90 may include a high pressure pump and/or a low pressure pump coupled to a water tank 92 and/or an agent tank 94. The pump system 90 is configured to pump water and/or a fire suppressing agent from the water tank 92 and the agent tank 94, respectively, to an implement, shown as water turret 96, coupled to the front end of the cab 20.

Figure 5:
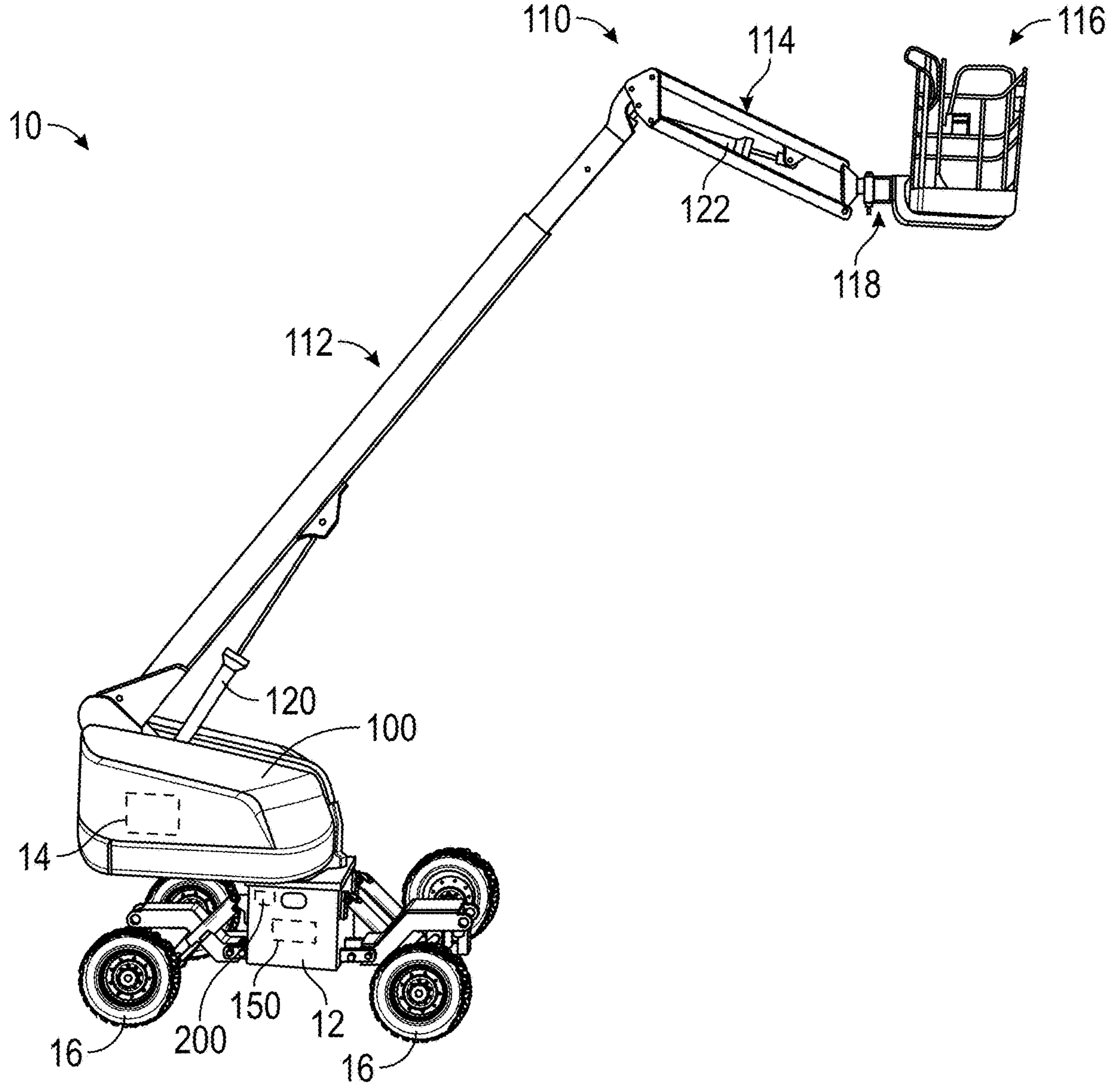
FIG. 5 is a perspective view of a lift vehicle, according to an exemplary embodiment.

According to the exemplary embodiment shown in FIG. 5, the vehicle 10 is configured as a lift device or machine (e.g., a boom lift, etc.). In other embodiments, the vehicle 10 is another type of vehicle (e.g., a skid-loader, a telehandler, a scissor lift, a fork lift, a boom truck, a plow truck, a military vehicle, etc.). As shown in FIG. 5, the frame 12 supports a rotatable structure, shown as turntable 100, and a first lift system or boom assembly, shown as boom 110. According to an exemplary embodiment, the turntable 100 is rotatable relative to the frame 12. According to an exemplary embodiment, the turntable 100 has a counterweight positioned at a rear of the turntable 100. In other embodiments, the counterweight is otherwise positioned and/or at least a portion of the weight thereof is otherwise distributed throughout the vehicle 10 (e.g., on the frame 12, on a portion of the boom 110, etc.).

As shown in FIG. 5, the boom 110 includes a first boom section, shown as lower boom 112, and a second boom section, shown as upper boom 114. In other embodiments, the boom 110 includes a different number and/or arrangement of boom sections (e.g., one, three, etc.). According to an exemplary embodiment, the boom 110 is an articulating boom assembly. In one embodiment, the upper boom 114 is shorter in length than lower boom 112. In other embodiments, the upper boom 114 is longer in length than the lower boom 112. In some embodiments, the boom 110 is a telescopic, articulating boom assembly. By way of example, the upper boom 114 and/or the lower boom 112 may include a plurality of telescoping boom sections that are configured to extend and retract along a longitudinal centerline thereof to selectively increase and decrease a length of the boom 110.

As shown in FIG. 5, the lower boom 112 has a lower end pivotally coupled (e.g., pinned, etc.) to the turntable 100 at a joint or lower boom pivot point. The boom 110 includes a first actuator (e.g., pneumatic cylinder, electric actuator, hydraulic cylinder, etc.), shown as lower lift cylinder 120. The lower lift cylinder 120 has a first end coupled to the turntable 100 and an opposing second end coupled to the lower boom 112. According to an exemplary embodiment, the lower lift cylinder 120 is positioned to raise and lower the lower boom 112 relative to the turntable 100 about the lower boom pivot point.

As shown in FIG. 5, the upper boom 114 has a lower end pivotally coupled (e.g., pinned, etc.) to an upper end of the lower boom 112 at a joint or upper boom pivot point. The boom 110 includes an implement, shown as platform assembly 116, coupled to an upper end of the upper boom 114 with an extension arm, shown as jib arm 118. In some embodiments, the jib arm 118 is configured to facilitate pivoting the platform assembly 116 about a lateral axis (e.g., pivot the platform assembly 116 up and down, etc.). In some embodiments, the jib arm 118 is configured to facilitate pivoting the platform assembly 116 about a vertical axis (e.g., pivot the platform assembly 116 left and right, etc.). In some embodiments, the jib arm 118 is configured to facilitate extending and retracting the platform assembly 116 relative to the upper boom 114. As shown in FIG. 5, the boom 110 includes a second actuator (e.g., pneumatic cylinder, electric actuator, hydraulic cylinder, etc.), shown as upper lift cylinder 122. According to an exemplary embodiment, the upper lift cylinder 122 is positioned to actuate (e.g., lift, rotate, elevate, etc.) the upper boom 114 and the platform assembly 116 relative to the lower boom 112 about the upper boom pivot point.

According to an exemplary embodiment, the platform assembly 116 is a structure that is particularly configured to support one or more workers. In some embodiments, the platform assembly 116 includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly 116 includes a control panel to control operation of the vehicle 10 (e.g., the turntable 100, the boom 110, etc.) from the platform assembly 116 and/or remotely therefrom. In some embodiments, the control panel is additionally or alternatively coupled (e.g., detachably coupled, etc.) to the frame 12 and/or the turntable 100. In other embodiments, the platform assembly 116 includes or is replaced with an accessory and/or tool (e.g., forklift forks, etc.).

Figure 6:
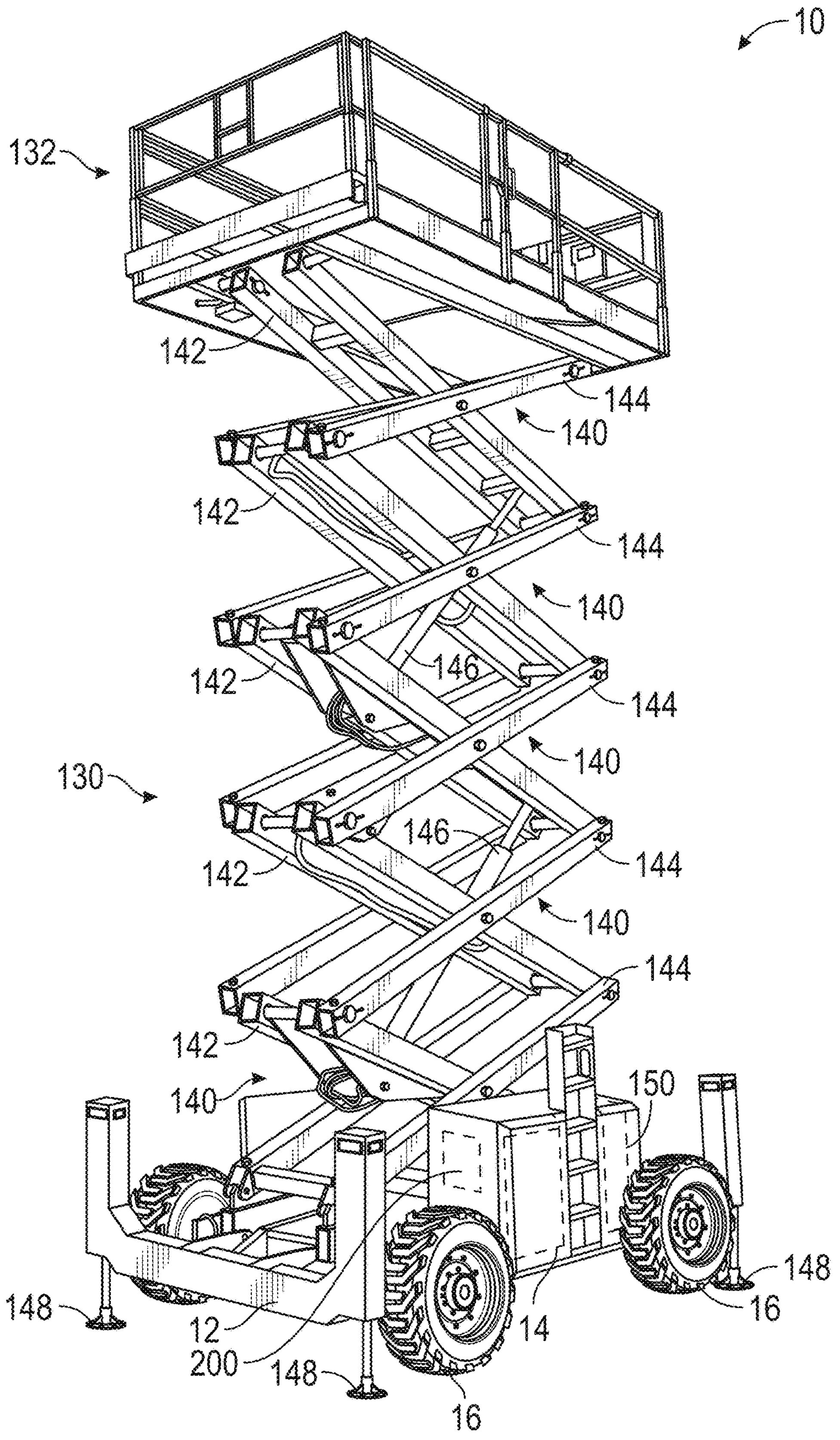
FIG. 6 is a perspective view of a lift vehicle, according to another exemplary embodiment.

According to the exemplary embodiment shown in FIG. 6, the vehicle 10 is configured as a lift device or machine (e.g., a scissor lift, etc.). As shown in FIG. 6, the vehicle 10 includes a second lift system (e.g., a scissor assembly, etc.), shown as lift assembly 130, that couples the frame 12 to a platform, shown as platform 132. The frame 12 supports the lift assembly 130 and the platform 132, both of which are disposed directly above the frame 12. In use, the lift assembly 130 extends and retracts to raise and lower the platform 132 relative to the frame 12 between a lowered position and a raised position.

As shown in FIG. 6, the vehicle 10 includes one or more actuators, shown as leveling actuators 148, coupled to each corner of the frame 12 and having feet or ground pads coupled to a free end thereof. According to an exemplary embodiment, the leveling actuators 148 extend and retract vertically between a stored position and a deployed position. In the stored position, the leveling actuators 148 are raised and do not contact the ground. In the deployed position, the leveling actuators 148 contact the ground, lifting the frame 12. The length of each of the leveling actuators 148 in their respective deployed positions may be varied to adjust the pitch (i.e., rotational position about a lateral axis) and the roll (i.e., rotational position about a longitudinal axis) of the frame 12. Accordingly, the lengths of the leveling actuators 148 in their respective deployed positions may be adjusted such that the frame 12 is leveled with respect to the direction of gravity, even on uneven or sloped terrains. The leveling actuators 148 may additionally lift the wheel and tire assemblies 16 off the ground, preventing inadvertent driving of the vehicle 10. In other embodiments, the vehicle 10 does not include the leveling actuators 148.

As shown in FIG. 6, the lift assembly 130 includes a number of subassemblies, shown as scissor layers 140. Each of the scissor layers 140 includes a first member, shown as inner member 142, and a second member, shown as outer member 144. In each scissor layer 140, the outer member 144 receives the inner member 142. The inner member 142 is pivotally coupled to the outer member 144 near the centers of both the inner member 142 and the outer member 144. Accordingly, the inner members 142 pivot relative to the outer members 144 about a lateral axis. The scissor layers 140 are stacked atop one another to form the lift assembly 130. Each inner member 142 and each outer member 144 has a top end and a bottom end. The bottom end of each inner member 142 is pivotally coupled to the top end of the outer member 144 immediately below it, and the bottom end of each outer member 144 is pivotally coupled to the top end of the inner member 142 immediately below it. Accordingly, each of the scissor layers 140 is coupled to one another such that movement of one scissor layer 140 causes a similar movement in all of the other scissor layers 140. The bottom ends of the inner member 142 and the outer member 144 belonging to the lowermost of the scissor layers 140 are coupled to the frame 12. The top ends of the inner member 142 and the outer member 144 belonging to the uppermost of the scissor layers 140 are coupled to the platform 132. Scissor layers 140 may be added to or removed from the lift assembly 130 to increase or decrease, respectively, the maximum height that the platform 132 is configured to reach.

As shown in FIG. 6, the lift assembly 130 includes one or more actuators (e.g., hydraulic cylinders, pneumatic cylinders, motor-driven leadscrews, etc.), shown as lift actuators 146, that are configured to extend and retract the lift assembly 130. The lift actuators 146 are pivotally coupled to an inner member 142 at one end and pivotally coupled to another inner member 142 at the opposite end. These inner members 142 belong to a first scissor layer 140 and a second scissor layer 140 that are separated by a third scissor layer 140. In other embodiments, the lift assembly 130 includes more or fewer lift actuators 146 and/or the lift actuators 146 are otherwise arranged. The lift actuators 146 are configured to actuate the lift assembly 130 to selectively reposition the platform 132 between the lowered position where the platform 132 is proximate the frame 12 and the raised position where the platform 132 is at an elevated height. In some embodiments, extension of the lift actuators 146 moves the platform 132 vertically upward (extending the lift assembly 130), and retraction of the linear actuators moves the platform 132 vertically downward (retracting the lift assembly 130). In other embodiments, extension of the lift actuators 146 retracts the lift assembly 130, and retraction of the lift actuators 146 extends the lift assembly 130. In some embodiments, the outer members 144 are approximately parallel and/or contact one another when the lift assembly 130 is in a stored position. The vehicle 10 may include various components to drive the lift actuators 146 (e.g., pumps, valves, compressors, motors, batteries, voltage regulators, etc.).

Figure 7A:
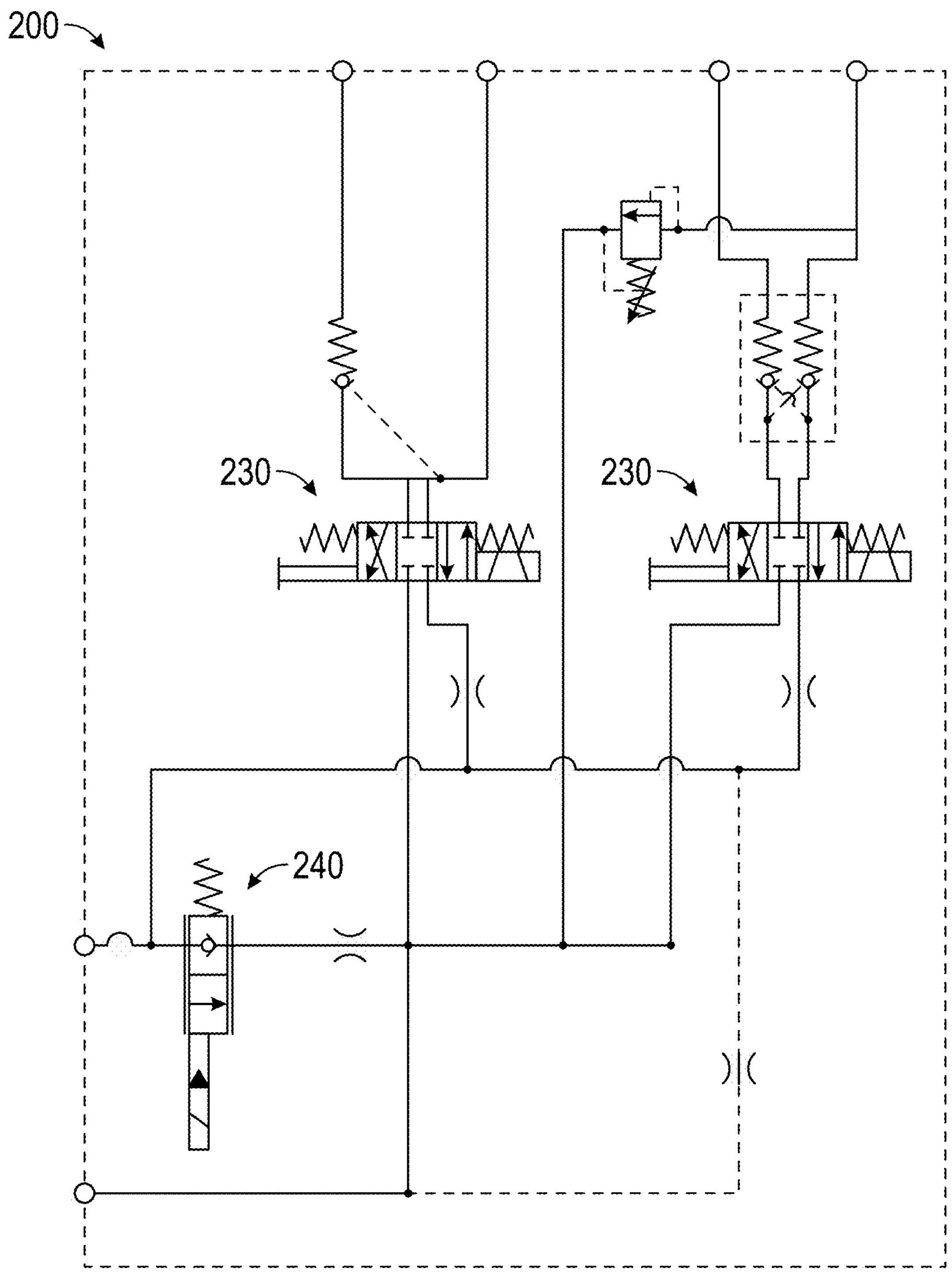
FIGS. 7A-7K are various schematic diagrams of a hydraulic circuit of a vehicle, according to an exemplary embodiment.
Figure 7B:
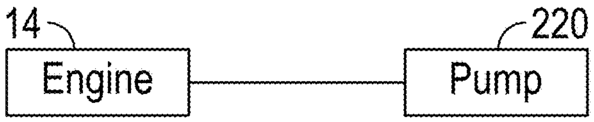
Figure 7C:
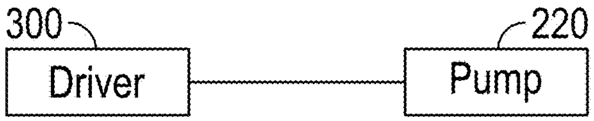
Figure 7D:
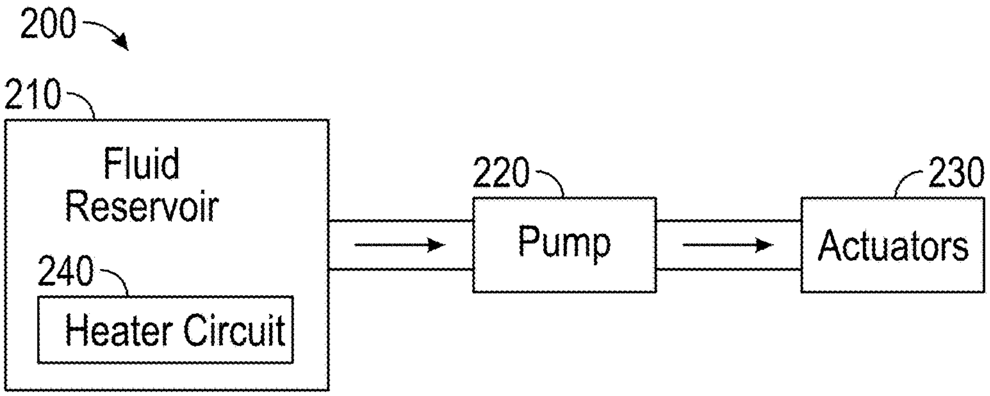
Figure 7E:
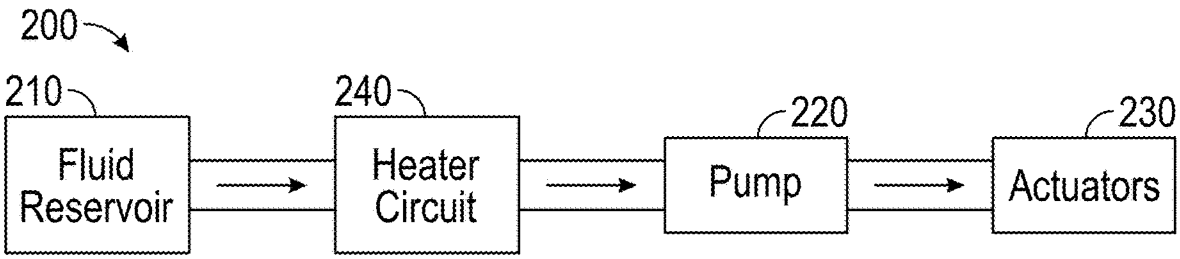
Figure 7F:
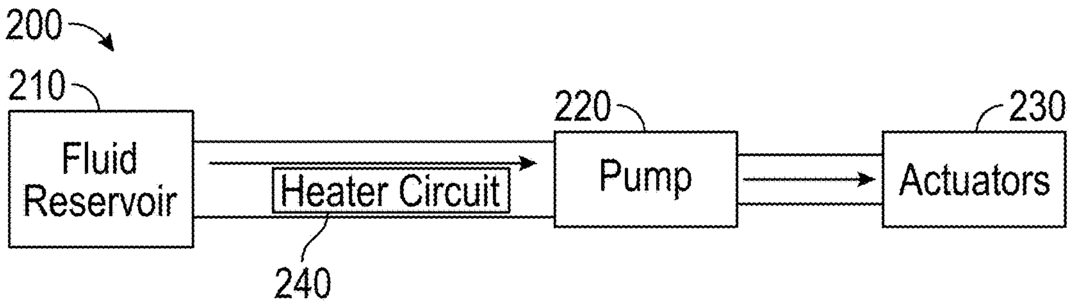
Figure 7G:
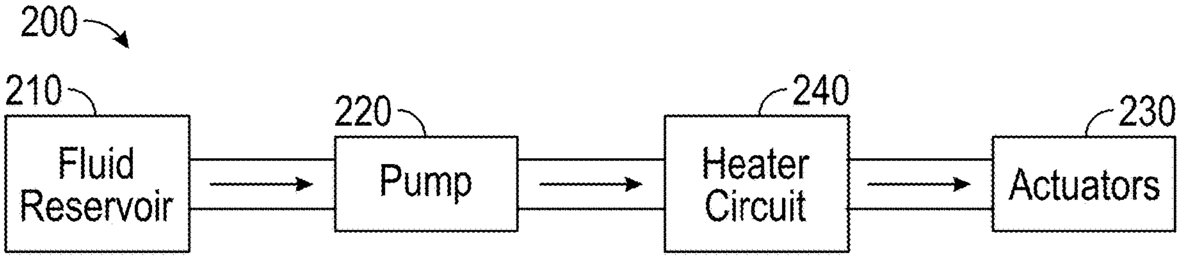
Figure 7H:
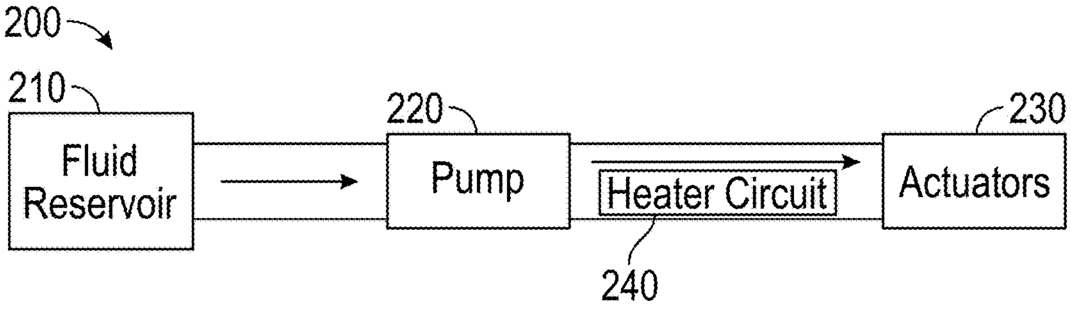
Figure 7I:
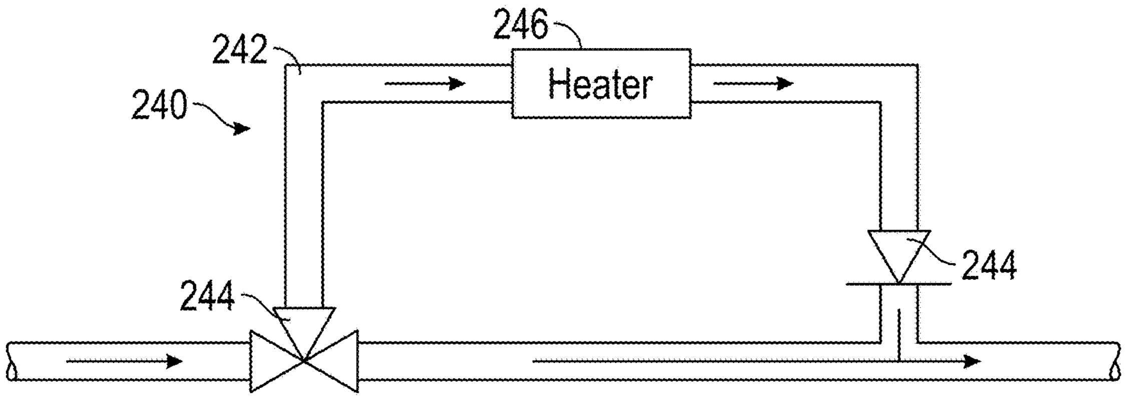
Figure 7J:
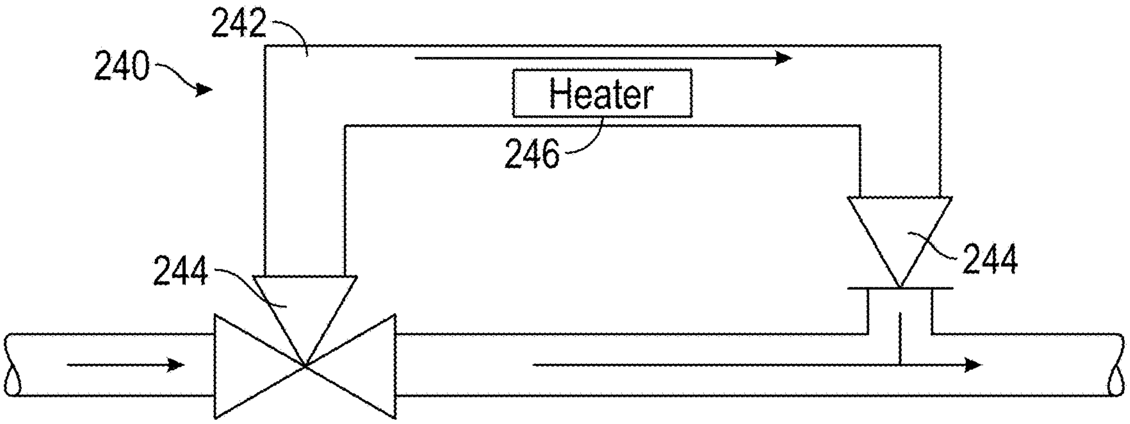
Figure 7K:
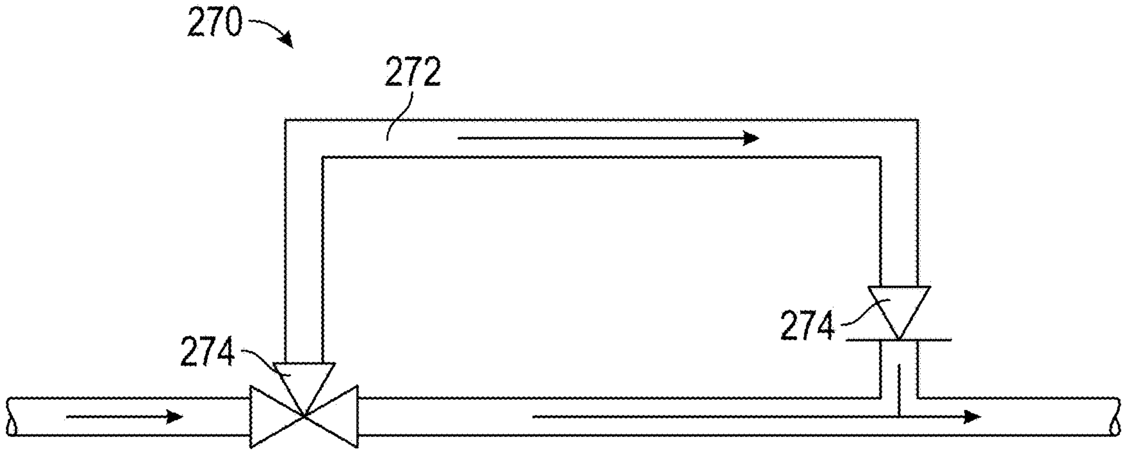
Figure 8:
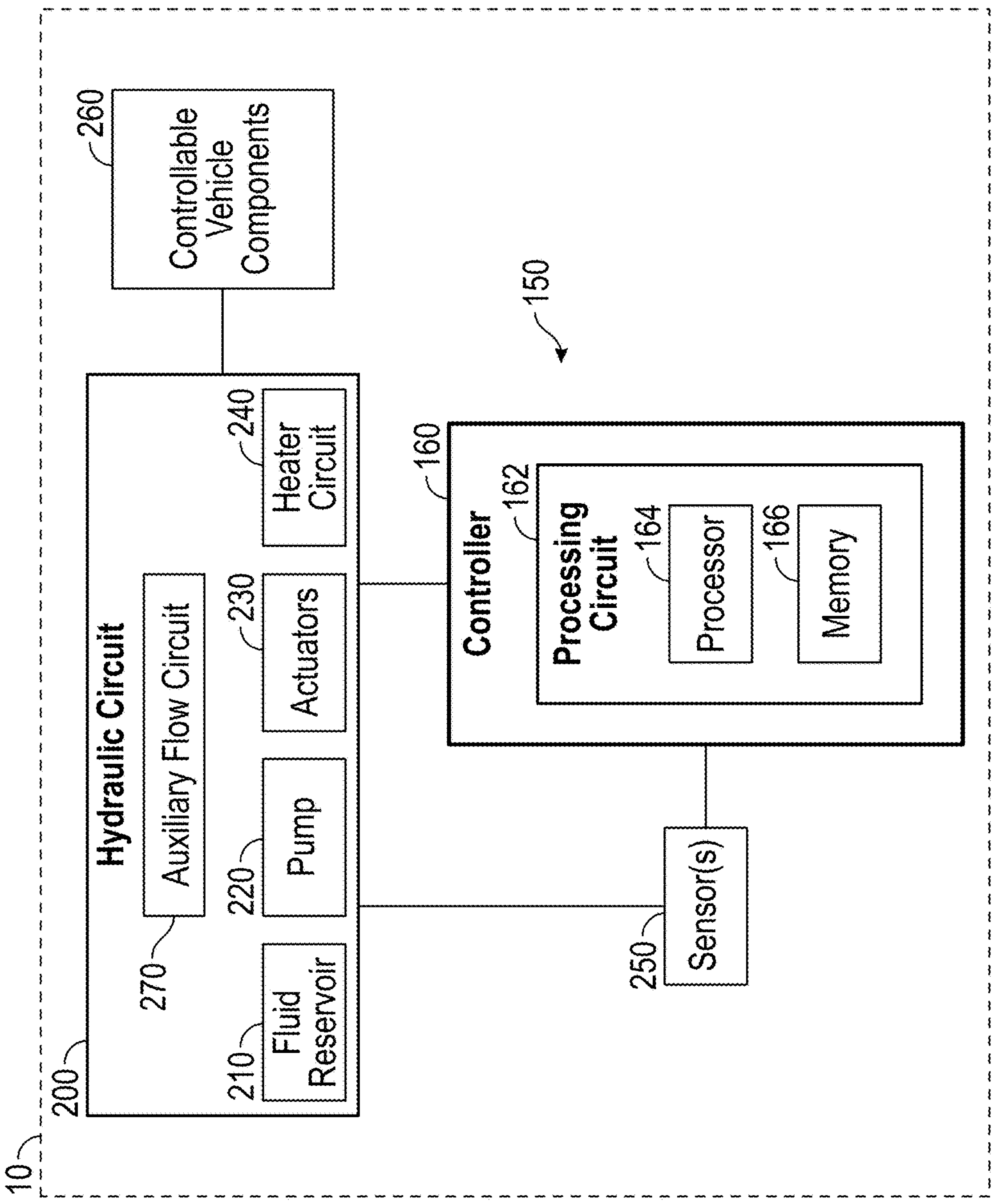
FIG. 8 is a schematic diagram of a control system of a vehicle, according to an exemplary embodiment.

As shown in FIG. 8, the hydraulic circuit 200 is coupled to (i) one or more sensors, shown as sensors 250, and (ii) one or more components of the vehicle 10, shown as controllable vehicle components 260 (e.g., the lift assembly 44, the tailgate 42, the outriggers 60, the downrigger(s), the ladder assembly 70, the pump system 90, the mixing drum 52, the chute 58, the boom 110, the lift assembly 130, the ground pads, etc.). As shown in FIGS. 7A-8, the hydraulic circuit 200 includes a reservoir, shown as fluid reservoir 210, a fluid driver, shown as pump 220, one or more actuators, shown as actuators 230, a temperature regulation system (e.g., a heater system, a heater, a heating element, heating assembly, etc.), shown as heater circuit 240, and an auxiliary circuit, shown as auxiliary flow circuit 270. According to an exemplary embodiment, the fluid reservoir 210 is configured to store hydraulic fluid, the pump 220 is configured to drive or pump the hydraulic fluid from the fluid reservoir 210 and throughout the hydraulic circuit 200 (e.g., to the heater circuit 240, to the actuators 230, etc.), and the actuators 230 are configured to receive the hydraulic fluid from the pump 220 to operate the controllable vehicle components 260. As shown in FIGS. 7B and 7C, the pump 220 is driven by the engine 14 and/or driven by an independent source, shown as driver 300 (e.g., an electric motor, an independent engine, etc.). The actuators 230 may include hydraulic actuators (e.g., the tailgate actuators 43, the lift arm actuators 46, the articulation actuators 48, actuators such as a hydraulic motor or hydraulic pump of the drum drive system 54, actuators of the chute 58, actuators of the outriggers 60, actuators of downriggers, actuators of the ladder assembly 70, actuators such as a hydraulic pump of the pump system 90, the lower lift cylinder 120, the upper lift cylinder 122, the lift actuators 146, the leveling actuators 148, etc.) driven by hydraulic fluid. The sensors 250 may include one or more temperature sensors positioned to acquire temperature data indicative of a temperature of the hydraulic fluid at one or more locations within the hydraulic circuit 200 (e.g., within the fluid reservoir 210, the heater circuit 240, the pump 220, and/or the actuators 230; upstream of the heater circuit 240, the pump 220, and/or the actuators 230; downstream of the heater circuit 240 and/or the pump 220; etc.).

According to an exemplary embodiment, the heater circuit 240 is positioned to heat the hydraulic fluid upstream of the actuators 230 such that the hydraulic fluid is provided to the actuators 230 above a minimum temperature threshold and within a target temperature range. As shown in FIG. 7D, the heater circuit 240 is configured to facilitate thermally regulating the hydraulic fluid within the fluid reservoir 210. As shown in FIGS. 7E and 7F, the heater circuit 240 is configured to facilitate thermally regulating the hydraulic fluid upstream of the pump 220. As shown in FIGS. 7G and 7H, the heater circuit 240 is configured to facilitate thermally regulating the hydraulic fluid downstream of the pump 220. According to an exemplary embodiment, the heater circuit 240 is configured to facilitate thermally regulating the hydraulic fluid without having to engage the actuators 230 to operate the controllable vehicle components 260 (e.g., allowing the hydraulic fluid to be thermally regulated while not being used such that the hydraulic fluid is always above the minimum temperature threshold of the target temperature range when needed to drive the actuators 230, etc.). As shown in FIGS. 71 and 7J, the heater circuit 240 includes a conduit, shown as conduit 242, and one or more valves, shown as valves 244, that selectively permit the hydraulic fluid to flow therethrough to engage with a heater, shown as heater 246, when the temperature of the hydraulic fluid needs to be heated (and may bypass the heater circuit 240 when heating thereof is not needed). For example, a controller may control the one or more valves 244 such that the hydraulic fluid may (i) flow through the heater circuit 240 when the one or more valves 244 are in a first position, orientation, or configuration (e.g., open, etc.) and (ii) bypass the heater circuit 240 when the one or more valves 244 are in a second position, orientation, or configuration (e.g., closed, etc.). In some embodiments, such as in FIGS. 7E and 7G, the hydraulic fluid always flows through the heater circuit 240, but the heater circuit 240 is only active and heating the hydraulic fluid when necessary. In other embodiments, such as in FIGS. 7D, 7F, and 7H, the heater circuit 240 does not receive the hydraulic fluid, but rather the heater circuit 240 is a heating element positioned within the fluid reservoir 210 and/or along the flow of the hydraulic fluid (i.e., the hydraulic fluid flows around the heater circuit 240 to be heated rather than flowing through the heater circuit 240). Accordingly, the heater circuit 240 may be or include a heater or heating element, a fluid conduit, and/or one or more valves.

According to the exemplary embodiment shown in FIG. 8, the control system 150 for the vehicle 10 includes a controller, shown as controller 160. In one embodiment, the controller 160 is configured to selectively engage, selectively disengage, control, and/or otherwise communicate with components of the vehicle 10. As shown in FIG. 8, the controller 160 is coupled to the hydraulic circuit 200 (e.g., the pump 220, the actuators 230, the heater circuit 240, etc.) and the sensors 250. In other embodiments, the controller 160 is coupled to more or fewer components.

The controller 160 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 8, the controller 160 includes a processing circuit 162 having a processor 164 and a memory 166. The processing circuit 162 may include an ASIC, one or more FPGAs, a DSP, circuits containing one or more processing components, circuitry for supporting a microprocessor, a group of processing components, or other suitable electronic processing components. In some embodiments, the processor 164 is configured to execute computer code stored in the memory 166 to facilitate the activities described herein. The memory 166 may be any volatile or non-volatile computer-readable storage medium capable of storing data or computer code relating to the activities described herein. According to an exemplary embodiment, the memory 166 includes computer code modules (e.g., executable code, object code, source code, script code, machine code, etc.) configured for execution by the processor 164.

According to an exemplary embodiment, the controller 160 is configured to (i) receive and monitor the temperature data acquired by the sensors 250 and (ii) selectively activate the heater circuit 240 (e.g., the heater, the one or more valves, etc.) and/or operate the pump 220 to drive the hydraulic fluid into the heater circuit 240 (e.g., in embodiments where the heater circuit 240 is external from the fluid reservoir 210, etc.) in response to the temperature of the hydraulic fluid within the hydraulic circuit 200 approaching or falling below a minimum threshold temperature of the target temperature range for the hydraulic fluid to heat the hydraulic fluid with the heater circuit 240. Such activation of the heater circuit 240 is independent of any operator input and may be independent of operation of the controllable vehicle components 260 (e.g., the actuators 230 do not need to be operated to heat the hydraulic fluid with the heater circuit 240, the hydraulic fluid can be heated regardless of the controllable vehicle components 260 being active, etc.).

In some embodiments, the controller 160 is configured to monitor the temperature data acquired by the sensors 250 and operate that pump 220 to drive the hydraulic fluid through the hydraulic circuit 200 (e.g., with the heater deactivated, etc.) or an independent circuit (e.g., like the heater circuit 240 but without the heater, the heater circuit 240 with the heater thereof deactivated, the auxiliary flow circuit 270, etc.) coupled to the hydraulic circuit 200 in response to the temperature of the hydraulic fluid within the hydraulic circuit 200 approaching or exceeding a maximum threshold temperature of the target temperature range for the hydraulic fluid to cool the hydraulic fluid. By way of example, as shown in FIG. 7K, the auxiliary flow circuit 270 includes a conduit, shown as auxiliary flow conduit 272, and one or more valves, shown as valves 274, that facilitate selectively permitting a flow of hydraulic fluid through the auxiliary flow conduit 272 (e.g., when activated by the controller 160, by diverting the hydraulic fluid from the hydraulic circuit 200 into the auxiliary flow conduit 272 of the auxiliary flow circuit 270, etc.). Running the hydraulic fluid through the piping of hydraulic circuit 200 or the independent circuit may permit cooling the hydraulic fluid without the need for a hydraulic cooling system.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single-or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10, the control system 150, and the hydraulic circuit 200 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A hydraulic system for a machine, the hydraulic system comprising:

- a hydraulic circuit including:
  - a first conduit;
  - a reservoir configured to store hydraulic fluid and coupled to the first conduit; and
  - a pump configured to drive the hydraulic fluid from the reservoir through the first conduit to an actuator;
- an auxiliary flow circuit including:
  - a second conduit;
  - a first valve coupling the first conduit to a first end of the second conduit, the first valve positioned to selectively permit the hydraulic fluid to flow through the second conduit; and
  - a second valve coupling the first conduit to a second end of the second conduit;
- a heater configured to facilitate selectively heating the hydraulic fluid, wherein (a) the heater is positioned inside the reservoir or (b) the heater is positioned downstream of the reservoir and upstream of the pump;
- a temperature sensor configured to acquire temperature data indicative of a temperature of the hydraulic fluid; and
- a controller configured to:
  - operate the pump to drive the hydraulic fluid from the reservoir through the first conduit to the actuator;
  - monitor the temperature of the hydraulic fluid; and
  - engage the first valve to divert the hydraulic fluid from the first conduit into the second conduit and back to the first conduit based on the temperature of the hydraulic fluid.

2. The hydraulic system of claim 1, wherein the heater is positioned along the first conduit and the hydraulic fluid does not flow through the heater.

3. The hydraulic system of claim 1, wherein the heater is positioned along the first conduit and the hydraulic fluid flows through the heater.

4. The hydraulic system of claim 1, wherein the heater is positioned along the second conduit and the hydraulic fluid does not flow through the heater.

5. The hydraulic system of claim 1, wherein the heater is positioned along the second conduit and the hydraulic fluid flows through the heater.

6. The hydraulic system of claim 1, wherein the controller is configured to engage the first valve to divert the hydraulic fluid from the first conduit into the second conduit and back to the first conduit to permit cooling the hydraulic fluid in response to the temperature of the hydraulic fluid exceeding or approaching a maximum temperature threshold.

7. The hydraulic system of claim 1, wherein the controller is configured to engage the first valve to divert the hydraulic fluid from the first conduit into the second conduit and back to the first conduit to permit heating the hydraulic fluid in response to the temperature of the hydraulic fluid falling below or approaching a minimum temperature threshold.

8. A hydraulic system for a machine, the hydraulic system comprising:

- a reservoir configured to store hydraulic fluid;
- an actuator;
- a first conduit coupling the reservoir to the actuator;
- a second conduit having a first end and a second end;
- a first valve positioned between the first end of the second conduit and the first conduit;
- a second valve positioned between the second end of the second conduit and the first conduit;
- a pump configured to drive the hydraulic fluid from the reservoir to the actuator; and
- a heater configured to facilitate selectively heating the hydraulic fluid,
- wherein the hydraulic fluid flows through the first conduit to the actuator when the first valve is in a first position,
- wherein the hydraulic fluid flows partially through the first conduit, through the second conduit, back to the first conduit, and to the actuator when the first valve is in a second position, and
- wherein the heater is positioned inside of the reservoir.

9. The hydraulic system of claim 8, wherein the heater is positioned along the first conduit.

10. A hydraulic system for a machine, the hydraulic system comprising:

- a reservoir configured to store hydraulic fluid;
- an actuator;
- a first conduit coupling the reservoir to the actuator;
- a second conduit having a first end and a second end;
- a first valve positioned between the first end of the second conduit and the first conduit;
- a second valve positioned between the second end of the second conduit and the first conduit;
- a pump configured to drive the hydraulic fluid from the reservoir to the actuator; and
- a heater configured to facilitate selectively heating the hydraulic fluid,
- wherein the hydraulic fluid flows through the first conduit to the actuator when the first valve is in a first position,
- wherein the hydraulic fluid flows partially through the first conduit, through the second conduit, back to the first conduit, and to the actuator when the first valve is in a second position,
- wherein the heater is positioned outside the reservoir, and wherein the heater is positioned along the second conduit.

* * * * *